3,291,565
PREPARATION OF BERYLLIA WHISKERS
Wilbert A. Taebel, Towaco, and Gerard W. Hoekstra, Oakland, N.J., assignors to National Beryllia Corp., Haskell, N.J., a corporation of New Jersey
No Drawing. Filed Jan. 28, 1965, Ser. No. 428,869
3 Claims. (Cl. 23—183)

This invention relates to a process for making single crystal fibers or whiskers of beryllia (BeO).

Whiskers and similar single crystal products of beryllia have been grown by a hydrothermal process similar to the process disclosed by W. W. Webb & W. D. Forgeng in J. Appl. Phy. 28, 1449–54 for growing sapphire microcrystals. See also Austerman & Hopkins CA 56, 11004h, relating to a process of growing BeO single crystals. Those conversant with the art of growing whiskers who have followed the teaching of these processes find that they leave much to be desired in that the crystal growth is sporadic, random and exceedingly difficult to control.

Whiskers or single crystal fibers of beryllia, like whiskers of other ceramic materials are useful as reinforcing agents for metals and high temperature ceramic bodies. For example, in Chem. & Engr. News of Aug. 14, 1961 (page 51) it is alleged that silver impregnated with sapphire whiskers is five times stronger than the metal itself. Beryllia fibers embedded in ceramic and plastic bodies have an additional advantage in that their high heat conductivity raises the heat conductivity of the entire body.

Among the objects of the invention is to provide an improved process for growing beryllia whiskers and single crystal fibers.

This invention is based on the discovery that beryllia fibers or whiskers can be grown in copius quantities from beryllium metal when said metal is mixed with a difficultly reducible metal oxide of the type having a lower valence, non-volatile, oxide. The mixture of beryllium and the metal oxide are heated in a dry hydrogen atmosphere to a temperature above 1278° C., the melting point of Be, and hydrogen gas is passed slowly over the mix. Under such conditions the BeO whiskers grow in close proximity to the molten Be. The upper limit of temperature to which the mix can be heated will depend somewhat on the oxide added but will ordinarily be about 1600° C. No great advantage is obtained at the higher temperatures.

A very suitable metal oxide for the process is titanium dioxide, $TiO_2$, which has a lower valence oxide, $Ti_2O_3$, of low volatility. The metal oxide added should not react with beryllia to form complex compounds because of the adverse effect such complex compounds have on the yield of pure beryllium oxide crystals, hence, an oxide such as silicon dioxide is detrimental. The reducible metal oxide should have a vapor pressure of preferably less than about $1 \times 10^{-2}$ mm. at 1200° C. and less than about 48 mm. 1800° C. Other metal oxides which may be added in place of part or all of the $TiO_2$ are, for example, cerium dioxide, zirconium dioxide, thorium dioxide and praseodymium tetraoxide.

The following example illustrates in detail how the process is carried out.

EXAMPLE

Beryllium metal powder and titanium dioxide powder in the weight ratio of 10:1 are placed in a beryllia vessel and the vessel is placed in a hydrogen atmosphere furnace. Dry hydrogen gas is slowly passed over the vessel at a rate of 4 cu. ft./hr. and at a velocity of about 400 ft. per hour, while the temperature is held at about 1550° C. After 1–2 hrs. the crucible has its surface substantially completely covered with BeO whiskers.

A similar (control) BeO vessel, containing the same amount of beryllium powder but no $TiO_2$, during the same cycle produced only a few whiskers deposited at the edge of the vessel.

The process is conducted under similar conditions when other reducible metal oxides as described above are substituted for all or for a part of the $TiO_2$.

The features and principles underlying the invention described above in connection with specific exemplifications will suggest to those skilled in the art many other modifications thereof. It is accordingly desired that the appended claims shall not be limited to any specific feature or details thereof.

We claim:
1. Process of growing beryllia whiskers comprising heating beryllium metal above its melting point in the presence of an oxide of a metal which is reducible to a lower valence oxide and having a vapor pressure of less than about $1 \times 10^{-2}$ mm. at 1200° C. and less than about 48 mm. at 1800° C. while in an atmosphere of substantially dry hydrogen, whereby beryllia whiskers grow in the vicinity of the molten beryllium.
2. Process as claimed in claim 1 wherein said reducible metal oxide is titanium dioxide and wherein said materials are heated to 1500° to 1600° C.
3. Process as claimed in claim 1 wherein said reducible metal oxide is selected from the group consisting of titanium dioxide, cerium dioxide, zirconium dioxide, thorium dioxide and praseodymium tetraoxide.

No references cited.

OSCAR R. VERTIZ, *Primary Examiner.*
E. STERN, *Assistant Examiner.*